Jan. 7, 1936. G. B. GROSVENOR Re. 19,806

ELECTRIC ELEVATOR SYSTEM

Original Filed May 23, 1922 4 Sheets-Sheet 1

Inventor

Graham B. Grosvenor by

Knight Bros

Attorneys

Jan. 7, 1936. G. B. GROSVENOR Re. 19,806

ELECTRIC ELEVATOR SYSTEM

Original Filed May 23, 1922 4 Sheets-Sheet 2

Inventor

Graham B. Grosvenor by Knight Bros

Attorneys

Jan. 7, 1936. G. B. GROSVENOR Re. 19,806

ELECTRIC ELEVATOR SYSTEM

Original Filed May 23, 1922 4 Sheets-Sheet 3

Inventor
Graham B. Grosvenor
by Knight Bros
Attorneys

Jan. 7, 1936. G. B. GROSVENOR Re. 19,806

ELECTRIC ELEVATOR SYSTEM

Original Filed May 23, 1922 4 Sheets-Sheet 4

Inventor
Graham B. Grosvenor
by
Knight Bros
Attorneys

Reissued Jan. 7, 1936 Re. 19,806

UNITED STATES PATENT OFFICE 19,806

ELECTRIC ELEVATOR SYSTEM

Graham B. Grosvenor, New York, N. Y., assignor to Otis Elevator Company, Jersey City, N. J., a corporation of New Jersey Original application May 23, 1922, Serial No. 563,094. Divided and application October 1, 1925, Serial No. 59,912, Patent No. 1,632,226, dated June 14, 1927. This application for reissue June 13, 1929, Serial No. 370,692

72 Claims. (Cl. 187—29)

This application is a reissue of a division of my Patent No. 1,632,225.

My invention relates to electric elevator systems and more particularly to the automatic control of the slowing down and stopping of high speed elevators.

The earliest electric elevators were controlled entirely by the operator, not only as to starting and stopping, but as to rate of acceleration and retardation. As the elevator art developed, the rate of acceleration and retardation was accomplished automatically by means controlled by the operator. Later automatic means for levelling the floor of the elevator even with the landings in stopping were applied. In certain of the most successful elevator systems of the present day, the operator may run the elevator at a plurality of approximately fixed speeds, but in ordinary operation he will move the car switch to full speed position on starting up and will avail himself of the automatic control of acceleration. In stopping he will bring the car switch to the neutral position at a distance from the landing corresponding to that which he has found by experience will bring the car to rest by the automatic retarding means within the zone of action of the levelling devices.

The distance from the landing at which the operator must initiate the automatic stopping in order to reach the landing in the least possible time is variable and depends on the speed of the elevator and the load, as well as on the particular means for retarding the elevator. Hence, in systems of the above type the skill of the operator is an important factor in securing a high average speed of the elevator.

The highest possible average speed will be obtained when the elevator is started at the maximum permissible acceleration, run at full speed, and then stopped with maximum permissible retardation so as to bring the floor of the car level with the landing. This may be regarded as a goal toward which elevator systems have striven.

One object of my present invention is to provide an automatic slow-down, which will come into action at varying distances from the landing, to automatically bring the elevator from the speed at which it is moving to a definite low speed. The distance from the landing at which the automatic slow-down device comes into operation is proportioned to the speed of the elevator so that it will always reach the low speed at a point within a short distance from the landing it is approaching.

Another object of my invention is to provide means whereby the definite low speed will correspond to the load in the elevator in such a manner that, by the action of devices suitably located in the hatchway to cut off the power and apply the brake at a fixed distance from the landing, the elevator will always come to rest approximately level with the landing. Other objects will appear from the detailed description.

To accomplish the first of these objects, I may, for example, use a pair of strips arranged to move in accordance with the movements of the elevator, but on a reduced scale. Suitable contacts are provided in the strips and stationary brushes corresponding with the landings are arranged to contact with the strips. A governor, provided with a plurality of pairs of contacts adapted to be closed successively as the speed of the governor increases, is driven by the elevator mechanism. These pairs of contacts are each connected in series with a contact in one of the strips and under proper conditions control the full speed operation of the elevator. Thus, as the elevator approaches a landing, when the controller is in the proper position for automatic slow-down, a circuit is completed through those particular contacts of the strip and governor that correspond to the position and speed of the car.

The second object is attained, for example, by using a motor-generator to supply current to the elevator motor and so designing the generator that its voltage will be greater when the elevator motor is lifting a load (whether in car or in counterweight) than when it is lowering it. In this way the speed of the elevator may be higher when the elevator is ascending loaded or descending light than it is when the elevator is ascending light or descending loaded. Then by taking advantage of the fact that the greater the load the elevator motor is lifting, the shorter the distance required to stop, and coordinating this with the speed characteristics as described above, the elevator will be brought to rest in substantially the same distance under all conditions of loading.

In my Patent No. 1,566,399, I have described an elevator system particularly suitable for use in connection with the present invention. In the present application, I describe in connection with certain features of my prior application my automatic slow-down and stop which, however, are applicable to other elevator systems.

In order that my invention may be fully understood, it will be described by way of example in connection with the accompanying drawings, in which Figure 1 is a schematic view showing the general arrangement of the apparatus of a system embodying my automatic slow-down and stop.

Figure 1:
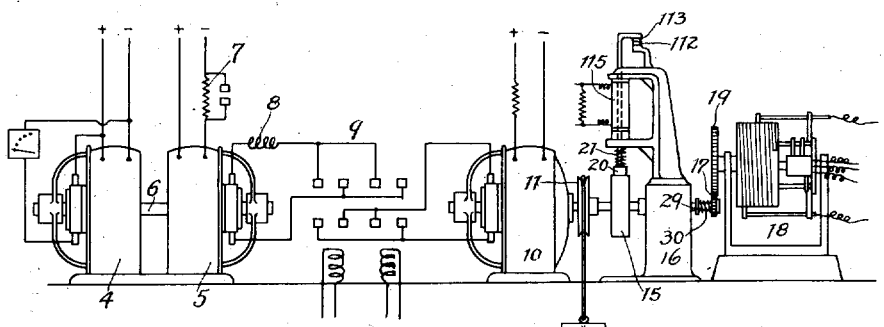

Referring more particularly to the drawings, the motor 4, Figure 1, operates from the supply mains and drives generator 5 through shaft 6. Generator 5 is separately excited and a resistance 7 is included in its field circuit. Motor 4 and generator 5 are kept running during such periods as the elevator is in service. A series field 8 for generator 5 is connected in the circuit leading to the reversing switch 9, from the armature terminals of generator 5. Elevator motor 10 is supplied with current for its armature through reversing switch 9, whereas its field is separately excited. On an extension of the shaft of elevator motor 10 is mounted sheave 11 over which runs the supporting cable 12 of elevator 13 and counterweight 14. Brake drum 15 of electromechanical brake 16 is also fastened on the extension of the shaft of motor 10. Brake 16 is so constructed that when the solenoid 115 is not energized, the shoe 20 is held against the drum 15 by spring 21 and the elevator motor 10 is brought to rest if moving, or held stationary if at rest. When solenoid 115 is energized spring 21 is compressed and the brake released.

The automatic slow-down controller 18 is shown as being driven by gear 19 from gear 17 which is mounted on the extension of the shaft of motor 10. The gears 17 and 19 are selected to give a reduction of motion to the slow-down controller that will cause its total travel to correspond to the total travel of the elevator. Controller 18 may be driven by any other means such as are commonly employed for operating floor controllers. Such drives comprise as an essential element means for rectifying errors in the required fixed relation between the motion of the controller and of the car, due to slip or creepage of the cable. One well-known means of accomplishing this is indicated at 29 where gear 17 is driven by friction produced by the pressure of spring 30. The controller 18 is so constructed that it can travel only the distance corresponding to the full travel of the elevator between the upper and lower landings. Consequently any errors due to slip or creepage will be corrected at the ends of each trip of the elevator.

At some suitable point, preferably at the top of the hatchway, is located a governor 22, which runs at a speed corresponding to the speed of the elevator. It is here shown as a centrifugal governor driven by cable 23 which is attached at both ends to the elevator 13 and runs over sheaves 24, 25, 26 and 27. The function of governor 22 is to close contacts in the circuit of the slow-down device 18, as will be described hereinafter. Governor 22 may be the usual governor which serves to actuate the safety devices for stopping the elevator in case of over-speed.

Automatic stopping switch 28 serves to bring the car to rest from low speed approximately level with the landing. It is here shown as a solenoid-operated switch in which the solenoid is mounted at a suitable point on the elevator car, whereas the armature 31 is mounted at a point in the hatchway in such relation that when the elevator floor is level with the landing, the armature 31 is opposite the cooperating part of the solenoid core.

Car switch 32 is mounted in the elevator car within easy reach of the operator.

Figure 2:
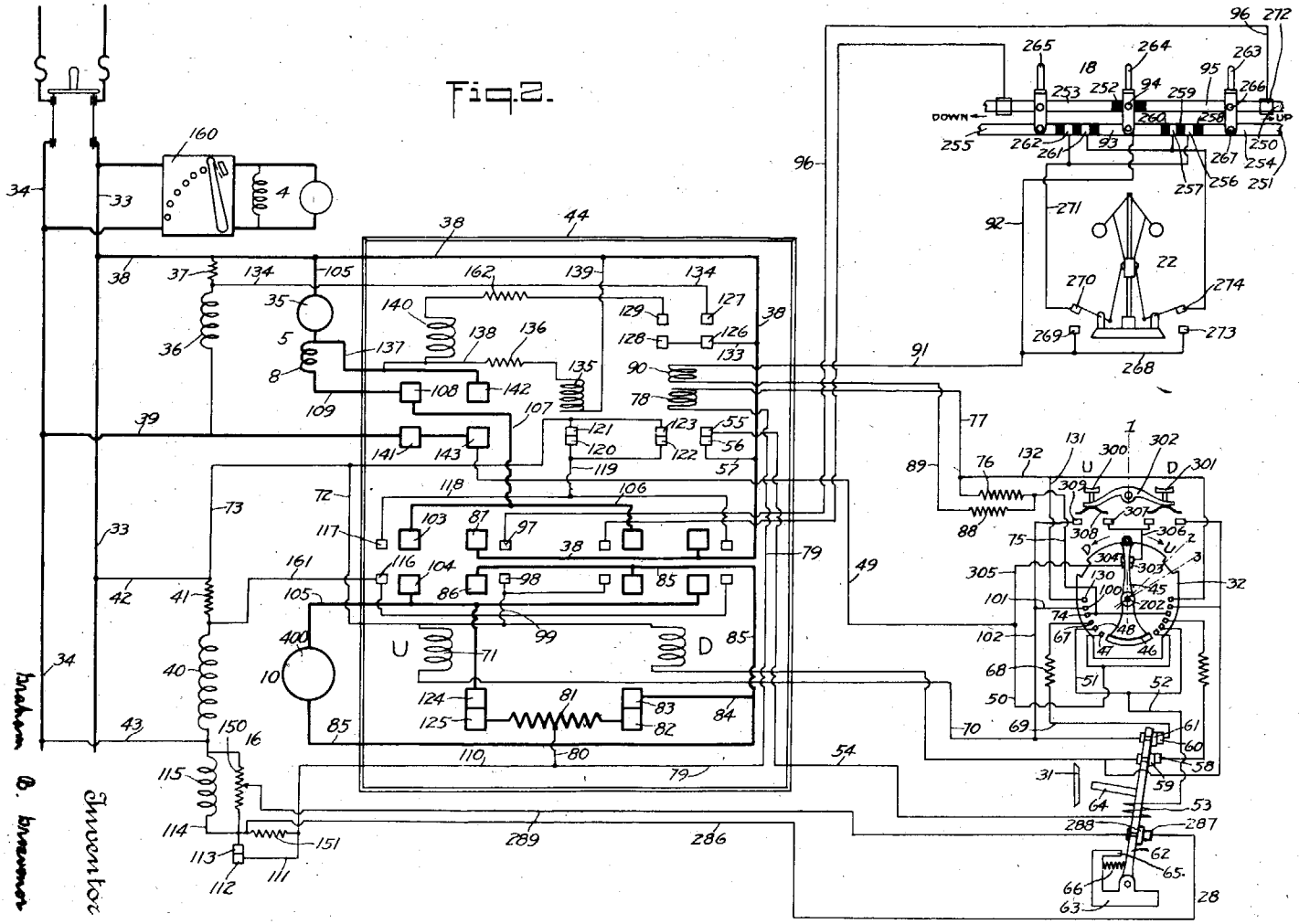
Figure 2 is a wiring diagram illustrating the action of my automatic slow-down and stop in connection with the system according to my Patent No. 1,566,399.

Referring to Figure 2, the shunt motor 4 is connected to the mains 33, 34 through the usual starting box 160. Motor 4 is of the constant speed type and drives the armature 35 of the generator 5 as described in connection with Figure 1. The field coil 36 of generator 5 is connected in series with the resistance 37 across mains 33, 34 by wires 38 and 39.

Field coil 40 of elevator motor 10 is connected through resistance 41 to mains 33, 34 by wires 42 and 43.

A control panel 44 is located at a suitable point, preferably in the motor room, and all the motor circuit closing switches are mounted on it. These switches are solenoid-operated, and are of any well-known form. As shown (Figure 2) the elevator is at rest at a landing. The generator 5 and its driving motor 4 are in operation and generator 5 is developing a prescribed low voltage which depends on the strength of the field and this is determined by adjusting the resistance 37. If the handle 45 of the car switch 32 be moved in the up direction U, so that contact 46 covers contacts 47 and 48, a circuit will be closed from main 34 through wires 39, 49, 50, contacts 47, 46, 48, wires 51, 52, solenoid winding 53 of magnetic stopping switch 28, wire 54, contacts 55, 56 and wires 57, 38 to main 33. By energizing solenoid 53 its core is attracted by the armature 31 and contacts 58, 59 and 60, 61 are opened. Stopping switch 28 may be constructed in various ways to accomplish this result. I have shown it as having, for example, a core 62 pivotally mounted at its lower end on the frame 63 which is attached to the elevator car. An arm 64 extends from core 62 toward the iron armature 31 which is fixed in the hatchway. Stop 65 prevents the arm 64 from coming into contact with armature 31 when solenoid 53 is energized and spring 66 moves core 62 away from armature 31 to close contacts 58, 59 and 60, 61 when solenoid 53 is deenergized. Contacts 59 and 61 are insulated from each other and from core 62 to which they are attached.

By a further movement of handle 45, whereby contacts 47, 48 and 67 are covered by contact 46, an open circuit is set (to be closed, as will be described later) from main 34 through wires 39, 49, 50, contacts 47, 46 and 67, resistance 68, wire 69, contacts 60, 61 (which however are open, due to the action of the stopping switch as last described) wire 70, solenoid winding 71 and wires 72, 73 and 42 to main 33.

Still further movement of handle 45 to cover contact 74 by contact 46 results in setting a circuit from main 34 through wires 39, 49 and 50, contacts 47, 46 and 74, wire 75, resistance 76, wire 77, solenoid winding 78, wires 79 and 80, resistance 81, contacts 82, 83, wires 84 and 85, contacts 86, 87 of the direction switch (which are still open) and wire 38 to main 33. At the same time a circuit is set from main 34 through wires 39, 49 and 50, contacts 47, 46 and 74, wire 75, resistance 88, wire 89, solenoid coil 90, wires 91 and 92, contact 93, bridge contact 94, insulating block 252, strip 95 of the slow-down controller, brush 272, wire 96, contacts 97, 98 which are adapted to close at the same time as the direction switch, and wires 99, 72, 73 and 42 to main 33.

Still further movement of handle 45 to cover contact 100 by contact 46 closes a circuit from main 34 through wires 39, 49 and 50, contacts 47, 46, 100, wires 101, 102 and 70, solenoid winding 71 of the direction switch, and wires 72, 73 and 42 to main 33. The closing of this circuit energizes winding 71 and closes contacts 86, 87 and contacts 103, 104 of the direction switch which is of any usual form of solenoid-operated switch that is held closed when its solenoid is energized and opened for example by gravity when the solenoid is deenergized. A circuit now extends from the armature 35 of generator 5 through wires 105, 38, contacts 87, 86, wire 85, armature 400 of elevator motor 10, wire 105, contacts 104, 103, wires 106, 107, contact 108, wire 109, series field 8 of generator 5 and back to the armature 35 of generator 5. At the same time a circuit is provided from main 33 through wire 38, contacts 87, 86, wires 85 and 84, contacts 83, 82, resistance 81, wires 80, 110 and 111, contacts 112, 113, wire 114 winding 115 of electromechanical brake 16 and wire 43 to main 34. The energizing of winding 115 releases the electromechanical brake 16 and the elevator now starts in the up direction at low speed. When the brake is entirely released, contacts 112, 113 open (see Figure 1) and resistance 151 is no longer short-circuited. Resistance 151 is so selected that when it is in the circuit of the solenoid, the current will be reduced to a minimum required to hold the brake off. This results in a saving of power since the full current is flowing through the solenoid circuit only at starting. Simultaneously with the closing of the up direction switch, contacts 116, 117 are closed and resistance 41 in series with the field winding 40 of elevator motor 10 is short-circuited through wire 161, contacts 116, 117, wires 118, 119, branch circuits through contacts 120, 121 and contacts 122, 123, and wire 73. This gives full field strength for elevator motor 10 in starting up, hence maximum starting torque. The act of closing the up direction switch simultaneously opens contacts 124, 125 thereby disconnecting resistance 81 from across the terminals of armature 400 of elevator motor 10. It is to be observed that the circuit from the car switch through winding 78 has now been closed by the closing of the direction switch and solenoid winding 78 is energized. Due to the resistance 76 in its circuit, however, it does not close contacts 126, 127 and contacts 128, 129 of the high speed switch since resistance 76 is so adjusted that it will not pass sufficient current to close the high speed switch but will allow sufficient current to pass through the solenoid, to hold the latter closed if it has been previously closed.

Still further movement of car switch handle 45 to cover contact 130 by contact 46 short circuits resistance 76 through wires 131 and 132, and solenoid winding 78 of the high speed switch is fully energized. Contacts 126, 127 are thereby closed and resistance 37 in the field circuit of generator 5 is short circuited through wire 134, contacts 127, 126 and wires 133 and 38. The voltage at the terminals of generator 5 will then increase at a rate dependent on the design of the generator and elevator motor 10 will increase in speed. Simultaneously with the closing of contacts 128, 129 and 126, 127 of the high speed switch, contacts 122, 123 are opened. Contacts 55, 56 are also opened, thereby deenergizing the winding 53 of the stopping switch 28.

When the voltage at the terminals of generator 5 has built up to a certain percentage (generally about 50%) of the normal full voltage, solenoid 135 is sufficiently energized to open contacts 120, 121. Since contacts 122, 123 have been previously opened by high speed switch solenoid 78, the short circuit across resistance 41 in the field circuit of elevator motor 10 is opened and elevator motor 10 will have a weaker field which will cause it to speed up. The voltage at which resistance 41 is inserted in the field circuit of elevator motor 10 may be adjusted by changing resistance 136. It is to be noted that resistance 136 and solenoid winding 135 are connected across the terminals of armature 35 of generator 5 through wires 137, 138 and 139, 38.

When the voltage at the terminals of generator 5 has built up to a certain percentage (generally about 75%) of the normal full voltage, solenoid 140 is sufficiently energized to close contacts 108, 141 and contacts 142, 143. The voltage at which this takes place may be governed by changing the resistance 162 in the circuit of solenoid winding 140. This results in placing both generator 5 and elevator motor 10 directly across the mains 33, 34. The armature circuit of generator 5 is now from main 33 through wires 38, 105, armature 35, wire 137, contacts 142, 143 and wire 39 to main 34. Series field 8 is short-circuited in order that driving motor 4 and generator 5, which is now running as a motor, may have similar characteristics for parallel operation. This is advisable because motor 4 and generator 5 are mechanically coupled. The armature circuit of elevator motor 10 is now from main 33 through wire 38, contacts 87, 86, wire 85, armature 400, wire 105, contacts 104, 103, wires 106, 107, contacts 108, 141, and wire 39 to main 34. Thus the elevator motor 10 is being supplied with current directly from the mains 33, 34. This is advantageous in that whenever the elevator is running at full speed, power consumption is kept to a minimum since the generator 5 and motor 4 will only require that amount of power necessary to turn them over.

Having described the circuits as they are successively closed in bringing the car switch to the full speed up position, I will briefly describe the action in moving the car switch handle back to neutral (neglecting the control by the automatic slow-down controller and stop, which will be described later).

By moving handle 45 back to uncover contact 130 of the car switch 32 the elevator will still run at full speed since solenoid 78 of the high speed switch is still sufficiently energized to hold the switch closed. Moving handle 45 to uncover contact 100 will result in no change since the direction switch is still held in by solenoid 71 by the circuit through the contacts 60, 61 of the magnetic stopping switch 28. Resistance 68 in this circuit is so proportioned that when it is in the circuit of solenoid 71, the current is sufficient to hold the switch closed but is not sufficient to close it. Further movement of handle 45 to uncover contact 74 results in deenergizing solenoid 78 of the high speed switch, which thereupon opens. Armature 400 of elevator motor 10 is then connected across armature 35 of generator 5 and the field of elevator motor 10 is restored to full strength. At the same time, the circuit short-circuiting resistance 37 in the field of generator 5 is opened and the voltage at the terminals of armature 35 drops. Since the elevator is running at full speed the generator will act as a dynamic brake for the elevator motor and will slow it down until its voltage corresponds to the low voltage delivered by the generator. By uncovering contact 67 the circuit through resistance 68, contacts 60, 61 and solenoid 71 of the direction switch is opened and the solenoid deenergized. The direction switch opens and the elevator comes to rest through the dynamic braking action of resistance 81 which is connected across the armature terminals of elevator motor 10 by the closing of contacts 124, 125. Resistance 81 may be made very low so that a strong braking action is applied. The opening of the direction switch also opens the circuit through the electro-mechanical brake 16 and allows it to act to assist in bringing the elevator to rest and to hold it stationary when it has stopped. It is to be noted that resistance 150 is shunted across the solenoid winding 115 of brake 16. This resistance serves to discharge the solenoid winding 115 when it is disconnected from its supply of current and by selecting the proper resistance the time required for full application of the brake can be governed. Further movement of handle 45 of the car switch to uncover contact 48 opens the circuit through solenoid 53 of the magnetic stopping switch and finally uncovering contact 47 opens the circuit from the main 34 to contact 46 on the car switch handle.

Although I have described the circuits set or closed as the car switch movable contact 46 covers each contact, it is not intended that the operator will avail himself of all the contacts in the ordinary operation of the elevator. By means of my automatic slow-down and stop in connection with other features of my system, the operator is enabled to normally control the elevator by moving the car switch handle to one of three positions which I have designated as 1, 2 and 3 (Figures 1 and 2).

Figure 5:
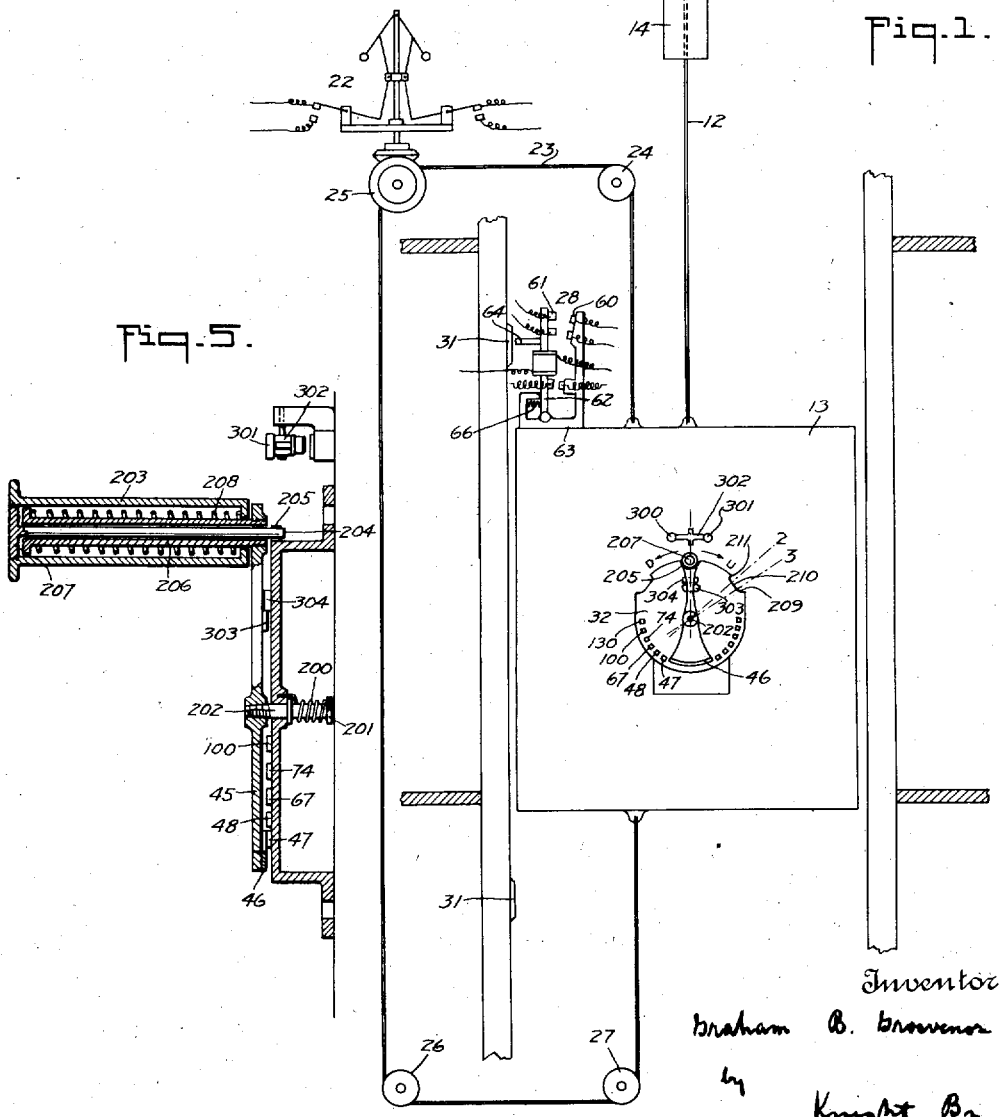
Figure 5 is a vertical cross-section of the car switch used by the operator in the elevator to control its movements.

Position 1 is neutral and there is no electrical connection to contact 46 of the car switch handle 45. Handle 45 is self-centering and tends to return to the neutral position whenever the operator removes his hand. This may be accomplished by the torsion spring 200 (Figure 5) one end of which is fastened to an enlargement 201 of the shaft 202 and the other end to the car switch body. When in the neutral position the spring has no tension. To move the handle in either the up or down direction it is necessary for the operator to move the grip 203 lengthwise in order to disengage the latch 204 from the notch 205. Grip 203 is slidably mounted on tube 206 which is securely screwed into handle 45. An enlargement 207 on latch 204 serves to attach it to grip 203. A compression spring 208 is mounted over tube 206, an enlargement of which serves as an abutment for the spring which at all times will tend to engage the latch.

Assuming normal operation in which it is desired to bring the elevator from one landing to another landing above it in the shortest time, the operator will release the latch 204 by sliding grip 203 longitudinally and move the car switch handle 45 to its extreme position (position 3) in the up direction so that the latch 204 will rest against the edge 209 of notch 210 (Figure 1). All contacts for up direction will then be closed on the car switch and the elevator will accelerate to full speed and run at that speed as long as the operator keeps the latch 204 pressed against the edge 209 of notch 210. The sequence of closing the various switches will be as already described in detail.

On approaching the landing at which it is desired to stop, the operator may, according to my invention, remove his hand from the car switch handle and the handle will then move toward the neutral position until latch 204 rests against the edge 211 of notch 210. This is position 2, and is the position in which the automatic slow-down and stop come into action. Contacts 47, 48, 67 and 74 are covered by contact 46 when the car switch is in position 2.

The principles of operation of slow-down controller 18 will be understood from the diagrammatic illustration shown in Figure 2, and a practical construction will be described later in connection with Figures 3 and 4. Two parallel strips 250 and 251 are mounted in such a manner that they will move together longitudinally in accordance with the movements of the elevator. Strip 250 is made up of a metallic portion 95, an insulating portion 252, and a second metallic portion 253. The insulating portion 252 is located at the point midway between the two ends of the strip. Strip 251 consists of a metallic portion 254 extending from one end toward the middle and another metallic portion 255 extending from the other end toward the middle. At definite distances from the center are mounted contacts 256 and 257 which are insulated from each other and from the strip 251 by insulators 258, 259 and 260. Contact 93 is located at the center of the strip and is of a definite length. Contacts 261 and 262 are similarly arranged on the other end of strip 251. Strips 250 and 251 are insulated from each other and from the mechanism that moves them. When the elevator is ascending, the strips move in the direction of the arrow designated up. Posts 263, 264 and 265 are mounted in fixed positions along the path of motion of the strips at intervals corresponding to the distance between landings. Each of these posts, as indicated at post 263, is provided with two brushes 266 and 267 which contact respectively with strips 250 and 251. The two brushes and post form a conducting bridge from one strip to the other and each set is insulated from the others.

With the elevator ascending at full speed and approaching the landing corresponding to post 263, at which it is desired to stop, the operator permits or causes the car switch to move from position 3 to position 2. The elevator will continue to run at full speed since the direction switch and high speed switch are still in until contact 256 on strip 251 comes under brush 267. Under the conditions just described, contacts 269 and 270 will be closed, due to the setting of centrifugal governor 22, which is driven from the elevator mechanism. Governor 22 is so set that contacts 269, 270 close when the elevator is nearly up to full speed and remain closed until the speed has dropped a small amount below full speed. A circuit will then be established from main 34 through wires 39, 49 and 50, contacts 47, 46 and 74, wire 75, resistance 88, wire 89, solenoid winding 90, wires 91, 268, contacts 269, 270, wire 271, contact 256, brushes 267, 266, strip section 95, brush 272, which is mounted to contact on strip 250, wire 96, contacts 97, 98 and wires 99, 72, 73 and 42 back to main 33. Thus the high speed switch solenoid is energized by the current flowing in this circuit as well as by that flowing in the circuit of which solenoid winding 78 forms a part. Winding 90, however, is wound in the reverse sense to winding 78 so that the effects of the two windings are neutralized and the high speed switch will open. As previously described, the generator voltage will immediately decrease and the elevator motor will be retarded by the dynamic braking action of the generator until it has reached the low speed corresponding to the low generator voltage.

Contact 256 is placed in strip 251 in such position that it will come under brush 267 at a time when the elevator is distant from the landing, the minimum required to bring the elevator from full speed to low speed so that it will reach low speed at a point within a few inches from the landing in the direction from which it is approaching.

The elevator continues at low speed until arm 64 of magnetic stopping switch 28 comes opposite the end of armature 31. Since solenoid 53 is energized, arm 64 will be attracted by the armature so that contacts 60, 61 will open and solenoid 71 of the up direction switch will be deenergized and allow it to open. Elevator motor 10 is thereby disconnected from the generator and resistance 81 is connected across the armature terminals of motor 10 by the closing of contacts 124, 125. At the same time, solenoid 115 of electro-mechanical brake 16 is deenergized and the brake is applied. In order to provide a quicker action of the electromechanical brake in automatically stopping resistance 150 may be divided into two sections, one of which is normally short-circuited by contacts 287, 288 of the magnetic stopping switch 28 through wires 286 and 289. When the arm 64 comes opposite armature 31, contacts 287, 288 are opened and the resistance across the coil 115 is increased, thereby applying the brake in less time.

The elevator will now be at rest with its floor approximately level with the landing and the operator may place the car switch handle in neutral position or leave it in position 2 until he desires to move the elevator car again.

Considering now the case in which the elevator is running at say three-quarters full speed and it is desired to stop at a landing: Such a case might be where the elevator is proceeding from one floor to the second floor above. The operator will place the car switch handle in position 2, and if the elevator is accelerating it will continue to do so, as full speed conditions in the control circuits still obtain. As the elevator is not up to full speed, contacts 269, 270 controlled by the centrifugal governor will not be closed and contact 256 of the slow-down controller will pass under brush 267 without causing any change. Contacts 273, 274, however, are adjusted so that they will be closed by the governor 22 when the elevator is running at three-quarters full speed. Consequently the elevator will continue toward the landing, and strips 250 and 251 of the slow-down controller will continue toward post 263. When contact 257 comes under brush 267, the circuit through contacts 274, 273 and solenoid winding 90 will be closed and the high speed switch will be opened. It is to be noted that the slow-down in this case is initiated at a time when the elevator is nearer the landing than in the case where the elevator was running at full speed. The distance from the landing at which slow-down is initiated is controlled by the location of contact 257 in strip 251 and is determined by the distance required to bring the elevator from three-quarters full speed to slow speed. The automatic stopping switch acts to stop the elevator at the landing in the same manner as previously described.

Considering a case where it is desired to ascend from one landing to the one next above, at which it is desired to stop: Assuming the car switch in neutral position, the operator will move it to position 3 and immediately return it to position 2. Although the control circuits will be set for full speed operation, it is unlikely that the elevator will reach full speed and it is probable that the speed will be below three-quarters full speed. Strips 250 and 251 of the floor controller will, therefore, move in accordance with the motion of the elevator, and since the speed is too low, the governor 22 will not close either contacts 269, 270 or contacts 273, 274. Consequently contacts 256 and 257 in strip 251 will pass under brush 267 without opening the high speed switch. When contact 93 in strip 251 comes under brush 267, a circuit will be closed through solenoid winding 90 and the high speed switch will be opened. This circuit is not controlled by the governor and operates to initiate automatic slow-down at all speeds below those under control of the governor. The length of contact 93 controls the time at which slow-down commences and is determined by the distance required to bring the elevator to slow speed, as in the previous cases. Although I have shown but three contacts in the slow-down controller corresponding to three elevator speeds, it is apparent that any other number may be used under the same principles of operation.

In all cases when the elevator is brought to rest at a landing, the post corresponding to that particular landing will be central with insulating block 252 and contact 93. In Figure 2, post 264 is so shown. Insulating block 252 is shorter than contact 93 so that in slowing down a circuit may be made from contact 93 through the bridge contacts of the posts to portion 95 or 253 of strip 250. Insulating block 252, however, serves the purpose of keeping the circuit through solenoid winding 90 of the high speed switch open at the time of starting the elevator from a landing, so that high speed operating conditions may be initiated immediately on bringing the car switch to full speed position.

I have found that in stopping a certain elevator from a full speed of six hundred feet per minute by means of my automatic slow-down and stop, it is necessary to have contact 256 come under brush 267 when the elevator is about nine feet from the landing. As the distance from landing to landing is usually about twelve feet, the operator has a zone about three feet high after passing the landing previous to the landing at which he desires to stop, in which to initiate the automatic slow-down and in addition a distance above the previous landing equivalent to one-half the length of insulating block 252 which may also be about three feet. If he moves the car switch to position 2 at any point within this six foot zone, he will make a perfect stop in a minimum of time. This is of great advantage over the controlling means heretofore in common use where it has been necessary for the operator to initiate the stopping at a definite distance from the landing in order to have the car come to rest exactly at the landing, without the use of levelling devices.

Whether the system is provided with an automatic stop or a manually controlled stop, the automatic slow-down represents an important improvement in the operation of elevators. It is peculiarly advantageous, however, in connection with an automatic stop, as will be apparent, and I regard the combination as a specific subject of invention in addition to the broad principles of the automatic slow-down per se.

If the operator desires to stop the elevator at any time, whether at a landing or between landings, without utilizing the automatic slow-down and stop, he may do so by placing the car switch handle 45 in the neutral position in which the automatic slow-down and stop are cut out. The elevator will then be brought to rest by the dynamic brake and electro-mechanical brake as though the automatic slow-down were not present.

Under certain conditions of operation, I may use push-buttons 300 and 301 to move the elevator for short distances at low speed. These are mounted immediately over the car switch in the elevator car. Push-button 300 is for up motion and push-button 301 for down motion, and they are mechanically interlocked by mounting one on each end of lever 302 so that both cannot be used at the same time. A contact 303 is provided on switch handle 45, but insulated from it, and is adapted to contact with a contact 304 (mounted on the car switch) when the handle 45 is in the neutral position. By pressing push-button 300, a circuit is closed from main 34 through wires 39, 49, 305, contacts 303, 304, wire 306, contacts 307, 308, 309, wires 102, 70, solenoid 71 of the up direction switch and wires 72, 73 and 42 to main 33. The direction switch will close, brake 16 will be released and the elevator will ascend at low speed as long as the operator keeps pressure on push-button 300.

It will be understood that down motion, both by the push-button 301 and by the car switch 32 in connection with the slow-down controller and magnetic stopping switch, is controlled in an exactly similar manner to that described for up motion.

Figure 3:
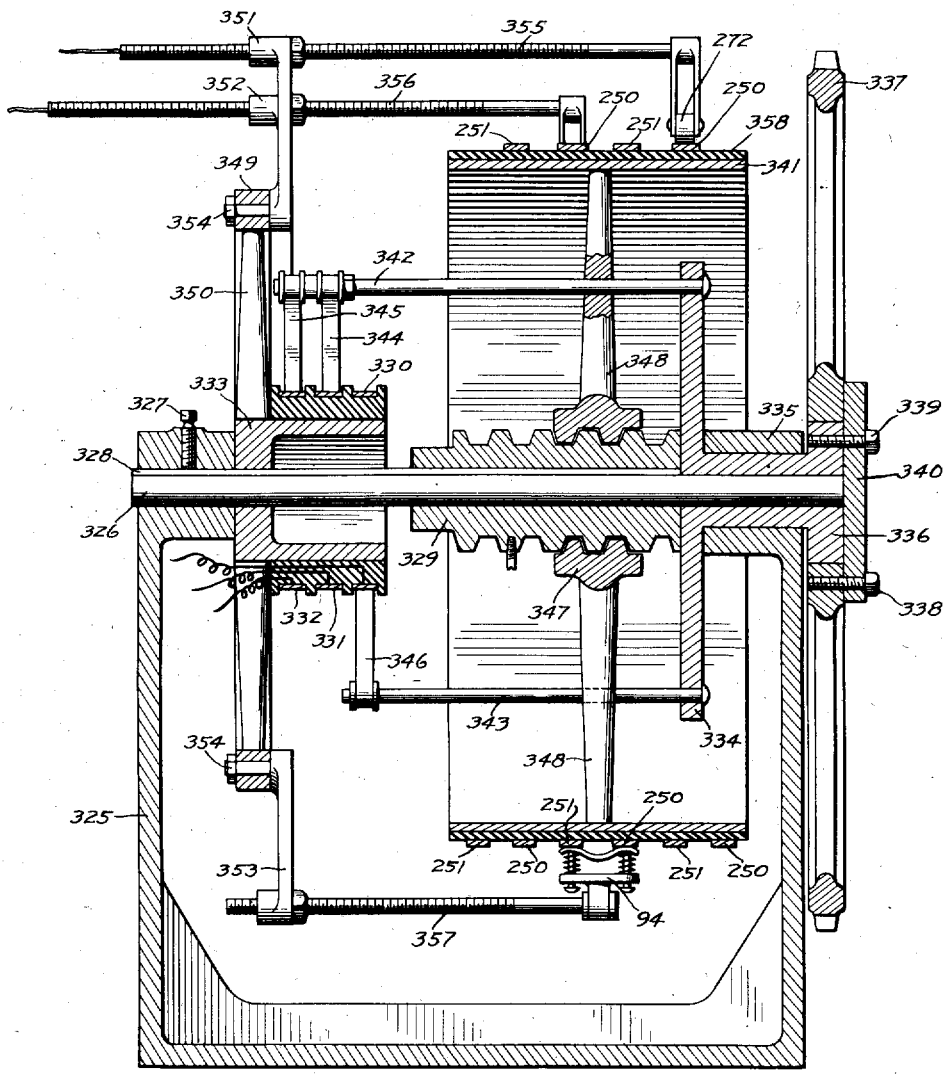
Figure 3 is a longitudinal section of my automatic slow-down controller.

In Figure 3, showing one form of slow-down controller, a frame 325 supports a shaft 326, which is kept from turning by set screw 327 and key 328. A worm 329 is fixed on the shaft 326 between the two standards of frame 325. Slip rings 330, 331 and 332 are also secured to shaft 326. These slip rings are insulated from each other and from their supporting member 333. Spider 334 is rotatably mounted on shaft 326 and in bearing 335. The hub 336 of spider 334 extends through bearing 335 and is driven by sprocket or gear 337 through bolts 338 and 339 and plate 340. Drum 341 is driven by studs 342 and 343 which are secured in spider 334 and pass through holes in spokes 348. Studs 342 and 343 carry at their outer ends brushes 344, 345 and 346. The hub 347 of drum 341 has turned in it a screw thread corresponding to that of the worm 329, on which it is mounted. Consequently the drum 341 has both a rotary motion and a motion lengthwise of the shaft, when the gear 337 is rotated. A ring 349 supported from member 333 by spokes 350 serves to hold adjustable arms 351, 352, 353, which can be placed at any point in the circumference of the ring 349. When located they are locked in place by bolts 354. Posts 355, 356 and 357 are mounted for lengthwise adjustment respectively in arms 351, 352 and 353. On the outer cylindrical surface of drum 341 are mounted the strips 250 and 251 of Figure 2 in the form of a helix having the same pitch as the worm 329. The strips are insulated from the drum by insulation 358. Brush 272 is mounted on post 355 and as shown in Figure 3, the bridge contact 94 is mounted on post 357. Post 356 holds the brush corresponding to brush 272 for down motion of the elevator. It will be understood that posts 263 and 265 (Figure 2) are mounted in suitable relation to post 357 on ring 349. It is apparent that as the drum 341 rotates the brushes will be maintained on the proper strips.

Figure 4:
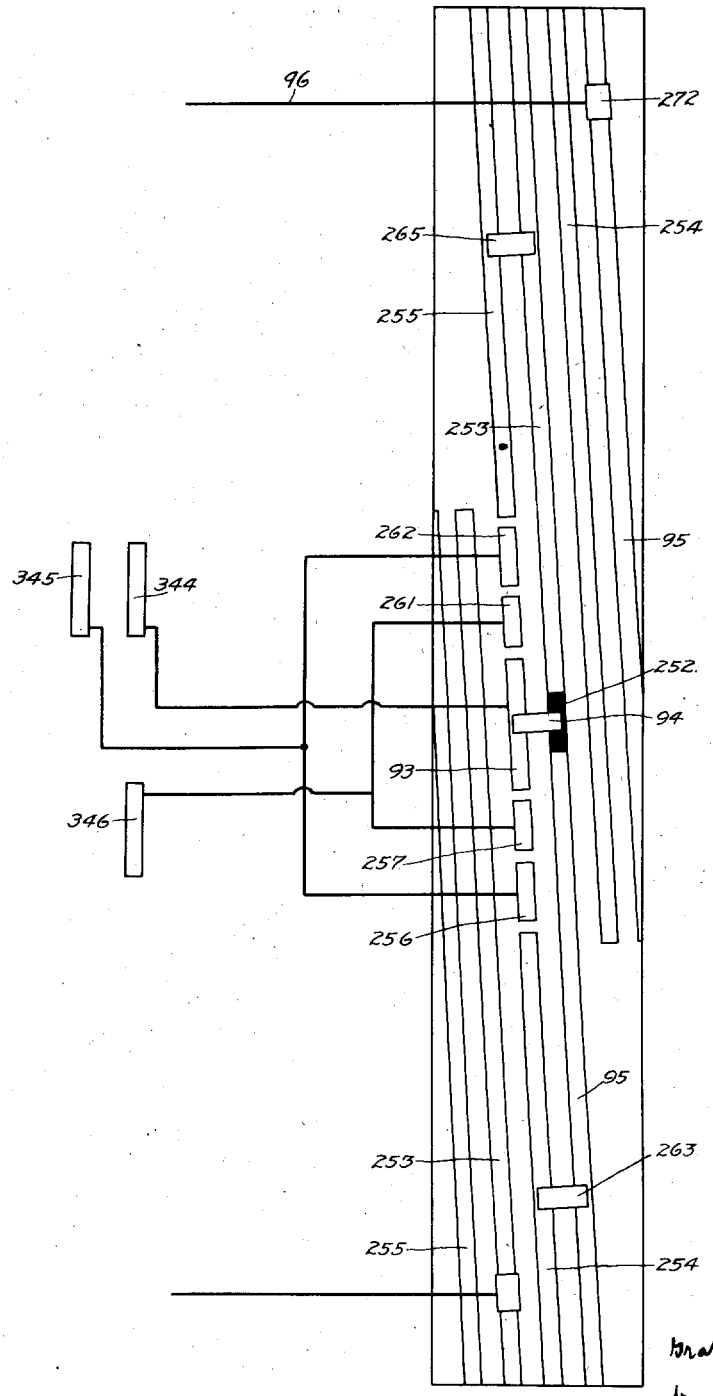
Figure 4 is a development of the cylindrical surface of the controller of Figure 3, showing the contacts and strips.

Figure 4 shows the developed surface of the drum 341 and diagrammatically the electrical connections and arrangements of contacts for a slow-down controller designed for three landings. This is the condition illustrated in Figure 2 and the same numerals are used in connection with Figure 4. As the operation was described in detail in connection with Figure 2, it is thought unnecessary to repeat it. Although I have described the slow-down controller as designed for three landings, it may be used for any number by proportioning the speed of the controller to that of the elevator so that when the elevator moves the full length of the hatchway the controller will rotate an amount that will cause the portion 95 of strip 250 to move under brush 272 from a point near insulating block 252 to a point near its end. In designing the controller it is also necessary to locate contacts 256, 257 and 93 in strip 251 so as to initiate slow-down at the proper distance from the landing.

Having described my improved system of elevator control I desire to point out that it affords means for maintaining the highest possible average elevator speed and for doing away with the necessity of highly skilled operators. To do this I employ automatically controlled acceleration and retardation, which can be made as rapid as desired and, in addition, I automatically determine the point at which the elevator will start to slow down so that regardless of its speed it will always reach a prescribed low speed at approximately the same distance from the landing. Further I automatically stop the elevator from the low speed approximately level with the landing without over-running. My control system enables the operator to select, while the car is in motion, the landing at which he desires to automatically stop and he has quite a range of distance in which to manipulate the car switch to accomplish this. Consequently his skill is not constantly taxed nor does he become so quickly fatigued.

I have found that in bringing elevators to rest, there is some variation in the distance required to stop them from any given speed, depending on the load in the elevator. The same considerations apply in bringing an elevator from any given speed to a lower speed. It is customary to counter-balance elevators and forty percent of the full load is a common amount. Considering an elevator for a maximum lifting capacity of two thousand five hundred (2500) pounds, counter-balanced forty percent, the maximum unbalanced load when the elevator is ascending fully loaded will be one thousand five hundred (1500) pounds, and the maximum unbalanced load when the elevator is descending light will be one thousand (1000) pounds. These amounts represent the weights the elevator motor must lift under the extreme conditions. In addition the motor must accelerate the total mass of the elevator, counterweights, cables, etc., and the brakes must retard these masses. When the elevator motor is lifting the unbalanced load, as when the elevator is ascending loaded or descending light, the elevator car will stop in a shorter distance after the power is turned off and the brakes applied, than it will stop when the unbalanced load is being lowered by the elevator motor.

To compensate for this variation in the distance required to stop, I provide means for controlling the speed of the elevator so that it will be in some direct proportion to the load on the elevator motor at both full and low speeds. In this way the tendency of the elevator to stop or slow down to a definite low speed in a shorter distance under conditions of load on the elevator motor is counteracted by the tendency to travel a greater distance due to increased speed. This is particularly important in the low speed operation of the elevator as it is from the low speed that the elevator is brought to rest at a landing. The means I employ to give an elevator speed that will be greater as the load on the motor increases, is the impressing on the armature terminals of the elevator motor 10 of a voltage that will be higher as the load on the motor increases. This voltage characteristic is produced by properly designing the generator 5 and particularly proportioning the series field 8 in reference to the separately excited field 36 to give the desired results.

I have obtained excellent results in automatically stopping an elevator under different conditions of loading by means of the invention described. As an example, the greatest variation in conditions for a particular elevator were found to be between stopping while ascending and stopping while descending with the elevator fully loaded and an unbalanced load of one thousand five hundred (1500) pounds. Under such conditions I was able to stop this elevator from low speed within one inch of the landing when approaching from either direction by making the prescribed low speed sixty feet per minute when the elevator was ascending and thirty-eight feet per minute when the elevator was descending. The voltages at the generator terminals corresponding to these speeds were 57 and 9 respectively. With the load in the car just balancing the counterweight, which is the average running condition, stops were made within one-eighth of an inch of the landing in either direction and the voltage was 34 for up motion and 32 for down motion.

This is an important improvement in elevator practice, where heretofore the speed has always been slower when the motor was lifting a load than when it was retarding it, and offers many advantages in automatic control, as has been pointed out.

I claim:—

1. An elevator system comprising an elevator car, a plurality of landings including at least one intermediate landing, means for bringing the elevator car from rest to full speed, and means for automatically initiating a reduction of the elevator car speed at different distances from any one of said landings.

2. An elevator system comprising an elevator car, a plurality of landings including at least one intermediate landing, means for bringing the elevator car from rest to full speed, and means for automatically initiating the slowing down of the elevator car at different fixed distances from any one of said landings.

3. An elevator system comprising means for bringing the elevator from rest to full speed, and means rendered operative by the operator for automatically initiating a reduction of the elevator speed at different fixed distances from a desired landing.

4. An elevator system comprising an elevator car, a plurality of landings including at least one intermediate landing, means for bringing the elevator car from rest to full speed, means for automatically initiating slowing down of the elevator car as it approaches any selected one of said landings, and automatic means for rendering said initiating means effective at different distances from the selected landing.

5. An elevator system comprising means for bringing the elevator from rest to full speed, means rendered operative by the operator in selecting a landing for automatically initiating a reduction of the elevator speed as the elevator approaches the landing selected, and automatic means for rendering said initiating means effective at different distances from said selected landing.

6. An elevator system comprising an elevator car, a plurality of landings including at least one intermediate landing, means for bringing the elevator car from rest to full speed, means for automatically initiating a reduction of the elevator car speed as the car approaches any selected one of said landings, and means responsive to the speed of the elevator car for rendering said initiating means effective at different distances from the selected landing.

7. An elevator system comprising means for bringing the elevator from rest to full speed, means rendered operative by the operator in selecting a landing for automatically initiating slowing down of the elevator at different fixed distances from the landing selected, and means responsive to the speed of the elevator for determining the fixed distance at which said initiating means becomes effective.

8. An elevator system comprising an elevator car, a plurality of landings including at least one intermediate landing, means for bringing the elevator car from rest to full speed, means for automatically initiating the slowing down of the elevator car at a distance from any one of said landings which distance varies in direct proportion to the elevator car speed.

9. An elevator system comprising means for bringing the elevator from rest to full speed, means rendered operative by the operator in selecting a landing for automatically initiating a reduction of the elevator speed at a distance from the landing selected which distance varies in direct proportion to the elevator speed.

10. An electric elevator system comprising in combination, means for bringing the elevator from rest to full speed, and means rendered operative by the operator for automatically initiating a reduction of the elevator speed at a distance from the desired landing depending upon the momentary speed of the elevator.

11. An electric elevator system comprising in combination means normally under control of the operator for bringing the elevator from rest to full speed, and means rendered operative by the operator for automatically initiating a reduction of the elevator speed at a distance from the desired landing depending upon the momentary speed of the elevator.

12. An elevator system comprising an elevator car, a plurality of landings including at least one intermediate landing, and means responsive to the speed of the elevator car for initiating slowing down of the elevator car at different distances from any one of said landings.

13. An elevator system comprising an elevator car, a plurality of landings including at least one intermediate landing, and means for automatically initiating a reduction of the elevator car speed at different fixed distances from any one of said landings depending on the momentary speed of the elevator car.

14. An elevator system comprising an elevator car, a plurality of landings including at least one intermediate landing, means for bringing the elevator car from rest to full speed, and means for automatically initiating a reduction of the elevator car speed at different distances from any one of said landings depending on the momentary speed of the elevator car.

15. An elevator system comprising an elevator car, a plurality of landings including at least one intermediate landing, means for bringing the elevator car from rest to full speed, and means for automatically initiating a reduction of the elevator car speed at a variable distance from any one of said landings, said last named means comprising means for determining said distance.

16. An elevator system comprising an elevator car, a plurality of landings including at least one intermediate landing, means for bringing the elevator car from rest to full speed, and means for automatically initiating a reduction of the elevator car speed at a variable distance from any one of said landings, said last named means comprising speed responsive means for determining said distance.

17. An elevator system comprising an elevator car, a plurality of landings including at least one intermediate landing, means for bringing the elevator car from rest to full speed, and means for automatically initiating a reduction of the elevator car speed to a definite low speed at different distances from a selected one of said landings.

18. An elevator system comprising means for bringing the elevator from rest to full speed, means rendered operative by the operator in selecting a landing for automatically initiating slowing down of the elevator to a definite low speed as it approaches the landing selected, and automatic means for rendering said initiating means effective at different distances from said selected landing.

19. An electric elevator system comprising in combination, means for bringing the elevator from rest to full speed, and means rendered operative by the operator for automatically initiating a reduction of the elevator speed to definite low speed at a distance from the desired landing depending upon the momentary speed of the elevator.

20. An electric elevator system comprising in combination, means normally under control of the operator for bringing the elevator from rest to full speed, and means rendered operative by the operator for automatically initiating a reduction of the elevator speed to definite low speed at a distance from the desired landing depending upon the momentary speed of the elevator.

21. An elevator system comprising an elevator car, a plurality of landings including at least one intermediate landing, means for automatically initiating a reduction of the elevator car speed at different distances from any one of said landings, and means for automatically initiating stopping of the elevator car as it arrives at a fixed distance from said any one landing.

22. An electric elevator system comprising an elevator car, a hoisting motor therefor, a source of current for the motor, means for interrupting the supply of current to said motor at a predetermined point in the movement of the car, and means for automatically causing the initial retardation of the motor with the car at varying distances from said point.

23. An elevator system control comprising in combination, a motor for driving the elevator, a motor control circuit, contact mechanism having stationary and travelling parts, the latter travelling through a space corresponding with the travel of the elevator, to make connection at successive spaced contacts related to the distance of the car from a landing, and means controlled by the speed of the elevator for connecting the motor control circuit selectively through one or another of said spaced contacts.

24. An elevator system control comprising in combination, a motor for driving the elevator, a motor control circuit, contact mechanism having stationary and travelling parts, the latter travelling through a space corresponding with the travel of the elevator, to make connection at successive spaced contacts related to the distance of the car from a landing, and another contact mechanism controlled by the speed of the elevator for connecting the motor control circuit selectively through one or another of said spaced contacts.

25. An electric elevator system comprising an elevator car adapted to stop at each of a plurality of landings, slow down switching mechanism for each of said landings for initiating a reduction of speed of the elevator car, and a switch common to said landings and operable by car movement to cause the stopping of car, after the speed has been reduced by the operation of the slow down switching mechanism for any one of the landings, at the landing corresponding to the slow down switching mechanism operated.

26. An electric elevator system comprising an elevator car adapted to stop at each of a plurality of landings, means for causing a reduction of speed of the elevator car to a low value, said means comprising a traveling contact, moving in accordance with the movement of the elevator car, and a plurality of stationary contacts, one for each of said landings, each stationary contact being arranged to be engaged by said traveling contact with the car at a certain distance from the corresponding landing, and means for causing the car to be brought from low speed to rest at the landings, said last named means comprising a switch common to said landings and arranged for operation as the car nears said landings.

27. An electric elevator system comprising an elevator car, means for raising and lowering the car, a car switch for controlling the raising, lowering and stopping of the car, and means rendered operative when the car switch is in stopping position, but inoperative when the car switch is in running position, for automatically initiating slow down at different fixed distances from a selected stopping point.

28. An electric elevator system comprising in combination, means for raising and lowering the car, a car switch for controlling the raising, lowering and stopping of the car, and means rendered operative when the car switch is in stopping position, but inoperative when the car switch is in running position, for automatically initiating slow down at varying distances from a selected stopping point, depending upon the momentary speed of the car.

29. An electric elevator system comprising an elevator car, a car switch having a neutral position, a starting position and a stopping position, said car switch being operable, upon movement from neutral position to starting position, to cause the starting of the car, and means rendered operative when the car switch is in stopping position for automatically initiating slow down as the car approaches a selected stopping point and for thereafter initiating the stopping of the car to bring it to rest at said point.

30. An electric elevator system comprising an elevator car, a car switch having a neutral position, a starting position and a stopping position, said car switch being operable, upon movement from neutral position to starting position to cause the starting of the car and, upon return to neutral position, to cause the stopping of the car at will, and means rendered operative when the car switch is in stopping position for automatically initiating slow down as the car approaches a selected landing and for automatically initiating stopping as it arrives at a predetermined distance from said landing.

31. An electric elevator system comprising an elevator car, a car switch having a neutral position, a plurality of running positions and a stopping position, means operative, when the car switch is in a running position, for causing the starting of the car and the bringing of the car up to a speed determined by the running position that the car switch is in, and means, rendered operative when the car switch is in stopping position, for causing the car to be maintained at said speed until the car arrives at a certain distance from the next landing and for then causing the slowing down and stopping of the car at said landing.

32. An electric elevator system comprising an elevator car, a motor for raising and lowering the car, a source of current for said motor, a car switch movable from neutral position to an operative position to cause current to be supplied from said source to said motor to start the car and movable to a second operative position to cause the maintaining of the supply of current from said source to said motor, and means, rendered operative when the car switch is in said second operative position, for automatically causing the initial retardation of the car upon its arrival at a certain distance from a selected landing and for thereafter causing the interruption of the supply of current to said motor to bring the car to rest at said landing.

33. An electric elevator system comprising an elevator car, means for raising and lowering the car, a car switch having a neutral position and two operative positions, a control circuit, established when the car switch is in one of said operative positions, for causing said means to start the car, another control circuit for causing said means to maintain the car in operation upon movement of the car switch to the other of said operative positions, and means, rendered operative when the car switch is in said other operative position, for automatically causing the initial retardation of the car, upon its arrival at a certain distance from a selected landing, and for thereafter causing the discontinuance of the operation of the first named means to bring the car to rest at said landing.

34. An electric elevator system comprising an elevator car, means for raising and lowering the car, a car switch having a neutral position and two operative positions, control circuits, established when the car switch is in one of said operative positions for causing said means to start the car to bring it up to full speed, other control circuits for causing said means to maintain the car in operation upon movement of the car switch to the other of said operative positions, and means, rendered operative when the car switch is in said other operative position, for automatically causing the initial retardation of the car, upon its arrival at a certain distance from a selected landing, and for thereafter causing the discontinuance of the operation of the first named means to bring the car to rest at said landing.

35. An electric elevator system comprising in combination, a motor for driving the elevator, a slow-down control circuit including in series relation a switch controlled by the speed of the elevator and a switch controlled by the distance of the elevator from a landing, and means controlled by the operator for causing the conjoint action of said switches to initiate a reduction in motor speed at a time determined automatically by the speed of the elevator and the distance of the elevator from the landing.

36. An electric elevator system comprising a car switch for controlling the normal operation of the elevator and manually controlled auxiliary means rendered operable when said car switch is in neutral position for operating the elevator.

37. An electric elevator system comprising a car switch for controlling the normal operation of the elevator and manually controlled auxiliary means operable only when the car switch is in neutral position for operating the elevator.

38. An electric elevator system comprising a car switch for controlling the normal operation of the elevator and manually controlled auxiliary means rendered operable when said car switch is in neutral position for operating the elevator continuously at will.

39. An electric elevator system comprising a car switch for controlling the normal operation of the elevator and manually controlled auxiliary means rendered operable when said car switch is in neutral position for operating the elevator in either direction.

40. An electric elevator system comprising in combination, a car switch for controlling the normal operation of the elevator and manually controlled auxiliary means rendered operable when said car switch is in neutral position for operating the elevator at low speed.

41. An electric elevator system comprising an elevator car, a motor therefor, a source of current for the motor, means for interrupting the supply of current to said motor at a predetermined point in the movement of the car, and means for causing the initial retardation of the motor when the car reaches a point, the distance of which from said predetermined point is determined in accordance with the speed of the car.

42. An electric elevator system comprising an elevator car, a motor therefor, a source of current for the motor, means for interrupting the supply of current to said motor at a predetermined point in the movement of the car, and means for decreasing the supply of current to the motor when the car reaches a point, the distance of which from said predetermined point is determined in accordance with the speed of the car.

43. An elevator system comprising an elevator car, a motor for raising and lowering said car, a source of power for said motor, means rendered operative by the operator in selecting a landing for automatically causing the initial retardation of the motor with the car at varying distances from the landing selected, and means for thereafter interrupting the supply of power to said motor when the car arrives at a certain distance from said selected landing.

44. An elevator system comprising an elevator car, a motor for raising and lowering said car, a source of power for said motor, means rendered operative by the operator in selecting a landing for automatically causing the initial retardation of the motor with the car at a distance from the landing selected determined in accordance with the speed of the car, and means for thereafter interrupting the supply of power to said motor when the car arrives at a certain fixed distance from said selected landing.

45. An elevator system comprising an elevator car, a motor for raising and lowering said car, a source of power for said motor, means rendered operative by the operator in selecting a landing for automatically causing a decrease in the supply of power from said source to said motor with the car at a distance from the landing selected determined in accordance with the speed of the car, and means for thereafter interrupting the supply of power to said motor when the car arrives at a certain fixed distance from said selected landing.

46. An electric elevator system comprising in combination, automatic means for slowing down and stopping the elevator at landings, and manually controlled means for stopping the elevator at will, said automatic means comprising a brake of relatively quick action and said manually controlled means comprising a brake of relatively slow action.

47. An electric elevator system comprising, an elevator car, a plurality of landings served by the car, including at least one intermediate landing, means controlled by the operator of the car for initiating the starting of the car and the acceleration thereof to full speed, means rendered effective by the operator of the car for initiating the slowing down of the car at varying distances from each of said landings after the initiation of starting and acceleration of the car has been effected by said first named means, said slow-down initiating means comprising control means for each of said landings and control means moved in accordance with the movement of said car for cooperating with the control means for the landings, and means for maintaining said starting and accelerating means effective after initiation, to continue the acceleration of the car and to maintain it in operation at full speed, in the event that acceleration is completed, until the slowing down of the car is initiated by said slow-down initiating means.

48. An electric elevator system comprising, an elevator car, a plurality of landings served by the car, including at least one intermediate landing, manually operable control switching mechanism carried by the car, means responsive to a certain operation of said control switching mechanism for causing the starting of the car and adapted to thereafter cause the acceleration thereof to full speed, control means for each of said landings, control means moved in accordance with the movement of said car for cooperating with the control means for any one of said landings to initiate the slowing down of the car at varying distances from such landing after the starting of the car has been effected in response to said certain operation of said control switching mechanism, said control means for each landing and control means moved in accordance with the movement of said car being rendered conjointly effective by said control switching mechanism to initiate slow-down.

49. An electric elevator system comprising, an elevator car, a plurality of landings served by the car, including at least one intermediate landing, a manually operable control switch having an operative position and an off position, means responsive to the operation of said control switch from said off position to said operative position for causing the starting of the car and adapted to thereafter cause the acceleration thereof to full speed, means for maintaining said first named means operative after operation in response to movement of said control switch to operative position, and means for initiating the slowing down of the car at different distances from each of said landings after the starting of the car has been effected in response to movement of said control switch to said operative position, said slow-down initiating means comprising control means for each of said landings and control means moved in accordance with the movement of the car for cooperating with said control means for the landings.

50. An electric elevator system comprising, an elevator car, a plurality of landings served by the car, including at least one intermediate landing, a manually operable control switch having a running position and an automatic slow-down position, means responsive to the operation of said control switch to running position for causing the starting of the car, and a slow-down controller actuated in accordance with the movement of said car and operative after movement of said control switch from said running position to said automatic slow-down position to initiate the slowing down of the car at varying distances from any one of said landings.

51. An electric elevator system comprising, an elevator car, a plurality of landings served by the car, including at least one intermediate landing, a manually operable control switch having a running position and an automatic slow-down position, means responsive to the operation of said control switch to running position for causing the starting of the car, control means for each of said landings, and control means moved in accordance with the movement of said car for cooperating with the control means for any one of said landings to initiate the slowing down of the car at varying distances from such landing, said control means for each landing and control means moved in accordance with the movement of the car being rendered effective to initiate slow-down at varying distances from a landing by their cooperation upon movement of said control switch from said running position to said automatic slow-down position.

52. An electric elevator system comprising, an elevator car, a plurality of landings served by the car, including at least one intermediate landing, a manually operable control switch having a running position and an automatic slow-down position, means responsive to the operation of said control switch to running position for causing the starting of the car, control means for each of said landings, and control means moved in accordance with the movement of said car and rendered operable upon movement of said control switch from said running position to said automatic slow-down position to cooperate with the control means for any one of said landings to initiate the slowing down of the car at different distances from such landing.

53. An electric elevator system comprising, an elevator car, a plurality of landings served by the car, including at least one intermediate landing, a motor for raising and lowering the car, a manually operable control switch in the car, said switch having a running position, control circuits established upon movement of said control switch to said running position for causing said motor to start the car to bring it up to full speed, other control circuits for causing said motor to maintain the car in operation upon movement of said control switch out of said running position, slow-down control means for each of said landings, and slow-down control means moved in accordance with the movement of said car and rendered effective by movement of said control switch out of said running position for cooperation with the slow-down control means for any one of said landings, selected by movement of said control switch out of running position, to initiate the slowing down of the car at different distances from such landing.

54. An electric elevator system comprising, an elevator car, a plurality of landings served by the car, including at least one intermediate landing; a motor for raising and lowering the car, a manually operable control switch in the car, said control switch having a running position and an automatic slow-down position, control circuits adapted upon being closed to cause said motor to start the car and to thereafter bring it up to full speed, switching mechanism responsive to the operation of said control switch to said running position for closing said control circuits, stationary slow-down control means for each of said landings, movable slow-down control means moved in accordance with the movement of said car and rendered effective upon movement of said control switch from said running position to said automatic slow-down position for cooperating with the stationary slow-down control means for any one of said landings to initiate the slowing down of the car at different distances from such landing, and additional control circuits for causing said motor to continue the acceleration of the car and to maintain it in operation at full speed, in the event that acceleration is completed, after movement of said control switch from said running position to said automatic slow-down position, until the slowing down of the car is initiated by the cooperation of said stationary and movable slow-down control means.

55. An electric elevator system comprising, an elevator car, a plurality of landings served by the car, including at least one intermediate landing, a motor for raising and lowering the car, a manually operable control switch in the car, said control switch having a running position and an automatic slow-down position, switching mechanism responsive to the operation of said control switch to running position for causing the starting of the car and acceleration thereof, stationary slow-down control means for each of said landings, and slow-down control means moved in accordance with the movement of said car for cooperating with the stationary slow-down control means for any one of said landings to initiate the slowing down of the car at different distances from such landing, said control switch maintaining said stationary slow-down control means and said slow-down control means moved in accordance with car movement ineffective to initiate slow-down so long as it is in said running position but rendering them effective to initiate slow-down at said different distances from a landing upon movement from said running position to said automatic slow-down position.

56. An electric elevator system comprising, an elevator car, a plurality of landings served by the car, including at least one intermediate landing, a motor for raising and lowering the car, a manually operable control switch in the car, said control switch having a running position and an automatic stop position, switching mechanism responsive to the operation of said control switch to running position for causing the starting of the car and acceleration thereof, stationary slow-down control means for each of said landings, slow-down control means moved in accordance with the movement of said car for cooperating with the stationary slow-down control means for any one of said landings to initiate the slowing down of the car at different distances from such landing, stationary stop control means for each of said landings, and stop control means moved in accordance with the movement of said car for cooperating with the stationary stop control means for the landing for which the slow-down initiation occurred upon the arrival of the car at a less distance from such landing for causing the car to be brought to a stop at such landing, said control switch maintaining said stationary slow-down control means and said slow-down control means moved in accordance with car movement ineffective to initiate slow-down and said stationary stop control means and said stop control means moved in accordance with car movement ineffective to cause the car to be brought to a stop at a landing while said control switch is in said running position but rendering them effective upon movement to said automatic stop position to slow down and stop the car.

57. In combination, an elevator car, an electro-magnet, means to close an energizing circuit for said electro-magnet, and means operable by movement of the car to be brought into and out of attractive relation with the said electro-magnet at predetermined points of car travel, and a switch movable by such attractive relation and returned to a normal position mechanically.

58. A control system for elevators comprising in combination, a hoisting motor, a circuit therefor closed initially by manual operation and maintained closed by means operable independently of car position to continue car movement automatically, and a switch mechanism effective to open said motor circuit, part of said mechanism stationary and part movable in accordance with the car.

59. A control system for elevators comprising in combination, a hoisting motor, switch mechanism closable manually to initiate start of the motor, means to maintain said mechanism closed to continue operation of the motor independently of manual operation, and means to cause said maintaining means to operate to discontinue the operation of said motor comprising a switch mechanism having magnetizing and magnetizable elements, certain of said elements being stationary and the other of said elements being movable in accordance with car movement.

60. A control system for elevators comprising in combination, a hoisting motor having a circuit therefor maintained closed automatically, normally closed contactors and a circuit controlled thereby effective to open said maintained circuit, and means to open said normally closed contactors comprising a magnetizing element and a magnetizable element, said elements brought into and out of attractive relation by movement of the car.

61. A control system for elevators comprising in combination, a hoisting motor, a circuit therefor closable manually, means operable independently of car position to maintain said circuit closed independently of manual operation, contactors and a circuit controlled thereby effective to open said motor circuit, and actuating means for said contactors having a magnetizable and a magnetizing element brought into and out of attractive relation by movement of the car.

62. A control system for elevators comprising in combination, a hoisting motor, means to maintain a circuit therefor closed automatically comprising a switch having an operating winding, normally closed contactors in the circuit of said winding, and means to open said contactors comprising a magnetizing and a magnetizable element brought into and out of attractive relation by movement of the car.

63. In combination, an elevator car, a control circuit therefor, and an electro-responsive switch to control said circuit comprising a switch arm and electro-magnet integral with each other, and a member magnetizable by said electromagnet, said magnet and member movable into and out of attractive relation by car movement.

64. In combination, an elevator car, and a switch comprising a pivoted switch arm and an electro-magnet formed integrally, and a member magnetizable by said electro-magnet, said magnet and member brought into and out of attractive relation by car movement.

65. In combination, an elevator car, a hoisting motor, a closed circuit for the motor, and a switch having normally closed back-contactors effective to open said motor circuit, said contactors actuated by a magnetizing and magnetizable element, into and out of attractive relation.

66. In combination, an elevator car, hoisting motor mechanism for moving the car at different rates of speed and switch mechanism comprising contactors effective to cause automatic slowdown and additional switch mechanism to cause car stop, one of said switch mechanisms actuated by magnetizing and magnetizable members brought into and out of attractive relation by movement of the car.

67. An automatic stop control switch for elevators comprising a switch arm and winding mechanically connected, and another member to form a path for the magnetic lines of said magnet, said winding and member brought into and out of attractive relation by movement of the car.

68. A control switch for elevators comprising a switch arm and winding the arm and winding movable as a unit, and a member to form a magnetic path for the magnetic lines of said magnet, said winding and magnet brought into and out of attractive relation by movement of the car.

69. A system of control for elevators, comprising a switch provided with means to maintain it closed automatically after being initially closed by manual operation, and means to control said maintaining means effective to open said switch comprising an electro-responsive device part on the car and part in the hoistway.

70. A system of control for elevators, comprising in combination, a car, motive means, control means comprising a manually controllable switch effective to start movement of the car away from a landing, means to maintain movement of the car away from said landing independently of manual operation, and stop contactors for the motive means actuable as the car approaches a stopping point, and means to actuate said contactors comprising an electro-magnet and magnetizable member brought into and out of attractive relation in accordance with car position.

71. The combination with an elevator motor and manual speed-controlling means therefor, of electroresponsive means for controlling the motor, a translating device movable in accordance with the movement of the elevator for controlling said electroresponsive means, and a magnetizable member energized from said device for rendering said electroresponsive means effective.

72. The combination with an elevator motor and manual speed-controlling means therefor, of electroresponsive means for controlling the motor, a translating device for controlling said electroresponsive means and magnetizable means for varying the effect of said translating device.

GRAHAM B. GROSVENOR.